(12) United States Patent
Stocq

(10) Patent No.: US 7,879,419 B2
(45) Date of Patent: Feb. 1, 2011

(54) THREE-DIMENSIONAL MICROSTRUCTURED MULTILAYER PRODUCTS

(75) Inventor: Robert Ghislain Stocq, Feignies (FR)

(73) Assignee: Morgan Adhesives Company, Stow, OH (US)

( * ) Notice: Subject to any disclaimer, the term of this patent is extended or adjusted under 35 U.S.C. 154(b) by 1144 days.

(21) Appl. No.: 10/583,424

(22) PCT Filed: Jan. 3, 2005

(86) PCT No.: PCT/BE2005/000001

§ 371 (c)(1),
(2), (4) Date: Jun. 19, 2006

(87) PCT Pub. No.: WO2005/063464

PCT Pub. Date: Jul. 14, 2005

(65) Prior Publication Data

US 2009/0263609 A1 Oct. 22, 2009

(30) Foreign Application Priority Data

Dec. 29, 2003 (EP) .................................. 03079017

(51) Int. Cl.
*B32B 9/00* (2006.01)
*B32B 33/00* (2006.01)
*B32B 7/12* (2006.01)
*B32B 15/04* (2006.01)

(52) U.S. Cl. .................... 428/40.1; 428/41.3; 428/41.4; 428/42.1; 428/343; 428/354

(58) Field of Classification Search ................. 428/40.1, 428/41.3, 41.4, 41.8, 42.1, 343, 352, 354
See application file for complete search history.

(56) References Cited

U.S. PATENT DOCUMENTS

| 4,556,595 A | 12/1985 | Ochi |
| 4,587,152 A | 5/1986 | Gleichenhagen et al. |
| 5,192,612 A | 3/1993 | Otter et al. |
| 5,296,277 A | 3/1994 | Wilson et al. |
| 5,346,766 A | 9/1994 | Otter et al. |
| 5,571,617 A | 11/1996 | Cooprider et al. |
| 5,650,215 A | 7/1997 | Mazurek et al. |
| 5,662,758 A | 9/1997 | Hamilton et al. |

(Continued)

FOREIGN PATENT DOCUMENTS

WO    WO 03/099953 A1    12/2003

*Primary Examiner*—Patricia L Nordmeyer
(74) *Attorney, Agent, or Firm*—Tom J. Hall

(57) ABSTRACT

A method of forming a three-dimensional microstructure on a flat surface of a support, comprising the application of a first flat and uniform layer of silicone on said surface of support and the application on the first layer of silicone of a second three dimensionally microstructured layer of silicone, said first layer and second layer of silicone become integrally connected to thus form a common three-dimensional microstructure ensuring anti-adhesive properties distributed regularly on the surface of the support, so that any flexible surface of substrate, in particular a surface of adhesive deposited on said layers of silicone will be microstructured by inverse replication of the three-dimensional microstructure formed by the two layers of silicone, where said layers of silicone are fixed by hardening by heating or by exposure to an ultraviolet or electronic radiation, or a combination thereof, applications thereof and films, notably self-adhesive films, such as those microstructured by said method.

12 Claims, 6 Drawing Sheets

U.S. PATENT DOCUMENTS

| | | |
|---|---|---|
| 5,795,636 A | 8/1998 | Keller et al. |
| 5,871,607 A | 2/1999 | Hamilton et al. |
| 6,123,890 A | 9/2000 | Mazurek et al. |
| 6,194,062 B1 | 2/2001 | Hamilton et al. |
| 6,197,397 B1 | 3/2001 | Sher et al. |
| 6,315,851 B1 | 11/2001 | Mazurek et al. |
| RE37,612 E | 3/2002 | Gleichenhagen et al. |
| 6,440,880 B2 | 8/2002 | Mazurek et al. |
| 6,489,022 B1 | 12/2002 | Hamilton et al. |
| 6,524,675 B1 | 2/2003 | Mikami et al. |
| 6,541,098 B2 | 4/2003 | Venkatasanthanam et al. |
| 6,602,580 B1 | 8/2003 | Hamilton et al. |
| 6,692,807 B2 | 2/2004 | Bries et al. |
| 6,838,150 B2 | 1/2005 | Mazurek et al. |
| 2004/0101647 A1 | 5/2004 | Pitzen |

THREE-DIMENSIONAL MICROSTRUCTURED MULTILAYER PRODUCTS

The present invention relates to a method of forming a three-dimensional microstructure on a flat surface of a support, to the uses of said method, as well as to the products and in particular to the self-adhesive films comprising such a three-dimensionally microstructured surface.

It is known to provide films made of adhesive which are sensitive to pressure, and whose topography is conferred by contacting the three dimensionally microstructured surface of a peelable protecting coating as support, which is essentially the inverse of the three-dimensional microstructure with which the surface of adhesive is contacted, and methods for the formation of such self-adhesive films. According to these methods, the three-dimensional structures are obtained either by mechanically embossing the support comprising a flat film made of silicone or by coating silicone on a support which already presents a microstructured surface, in that case matching the topography of the support. Although the methods for the formation of such self-adhesive films generally turn out to be rather satisfactory, they have limited application, as they can only be produced on expensive polyethylene or polypropylene supports. In the case of polyethylene and silicone supports, the formation of microstructures in the silicone is carried out by hot embossing at speeds on the order of 0.9 m/min of the engraved cylinder which is used for this purpose, which considerably slows the productivity and raises the production costs of the finished products.

Various articles and other pressure sensitive microstructured adhesive materials or films are disclosed by patent publications e.g. EP 149135 discloses pressure sensitive adhesive structures having islands of adhesive, EP 180598 discloses removable label stock having adhesive segments, and EP 861307 discloses an adhesive sheet having a plurality of adhesive pegs and also it should be mentioned patent application WO 97/43319 relating to top coat film useable in preparing a stable polymeric laminated data carrying device, said topcoat film comprising a topcoat layer being formed from a composition comprising a polymerizable composition and a polymeric binder, which is substantially plasticizer free, and wherein the ratio by weight of polymerizable composition to polymeric binder is between 0.75:1 and 1.50:1 inclusive. U.S. Pat. No. 4,986,496 relates to an article capable of reducing the resistance to drag of a fluid flowing thereover, which comprises a thermoset polymeric sheet formed in situ from the reaction product of an isocyanate with a polyol, said sheet having a surface contacting said fluid comprising a series of parallel peaks separated from one another by a series of parallel valleys. Patent application EP 0 382 420 A2 provides a composite plastic article comprising a tough, flexible substrate, one face of which bears a microstructure of discontinuities, which microstructure has a depth of 0.025 mm to about 0.5 mm, and comprises a cured oligomeric resin having hard segments and soft segments, the cured resin being substantially confined to the microstructure portion of the composite.

One of the purposes of the present invention, consequently, consists in overcoming the above-mentioned drawbacks and in providing a method of forming a three-dimensional microstructure on a flat surface of a support which wholly differs from the known processes consisting in deforming a previous plane surface, presiliconized or not to get the desired final microstructured surface.

For this purpose, according to the present invention, the above-mentioned method of making a three-dimensional microstructure comprises the application of a first flat and uniform layer of silicone on said surface of support and the application on the first layer of silicone of a second three dimensionally microstructured layer of silicone, said first layer and second layer of silicone became integrally connected to thus form a common three-dimensional microstructure ensuring anti-adhesive properties distributed regularly on the surface of the support, so that any flexible surface of substrate, in particular a surface of adhesive deposited on said layers of silicone will be microstructured by inverse replication of the three-dimensional microstructure formed by the two layers of silicone, said layers of silicone being fixed by hardening by heating or by exposure to an ultraviolet or electronic radiation, or a combination thereof.

Another purpose of the present invention consists in providing a method for three-dimensional microstructuring of a surface made of a flexible substrate, in particular a surface of adhesive, which can be produced on any type of substrate, such as papers, plastic films or others, and which allows one to work at very high speed, thus increasing the productivity considerably compared to the known prior methods.

For this purpose, according to the present invention, the above-mentioned three-dimensional microstructuring method comprises the application of a first layer of silicone, which is substantially flat and uniform, on a surface of a support, the application on the first layer of silicone of a second three dimensionally microstructured layer of silicone, where said first and second layers of silicone become integrally connected thus forming a common three-dimensional microstructure ensuring anti-adhesive properties which are distributed evenly over the surface of the support, and the deposition of the flexible surface of substrate, in particular of the surface of adhesive, on the above-mentioned layers of silicone in such a manner that said surface made of flexible substrate, in particular of adhesive, is microstructured by inverse replication of the common three-dimensional microstructure formed by the first layer of silicone and the second layer of silicone, where said layers of silicone are fixed by hardening by heating or by exposure to an ultraviolet or electronic radiation, or a combination thereof.

Advantageously, the first layer of silicone comprises at least one functionalized polyorganosiloxane with groups

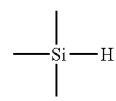

as crosslinking agent, and at least one functionalized polyorganosiloxane which can react with the crosslinking agent, or it comprises a functionalized polyorganosiloxanes with groups

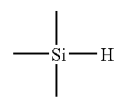

as crosslinking agent, and at least one functionalized polyorganosiloxane with groups

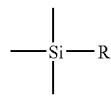

which can react with the crosslinking agent, where R comprises at least one ethylenic unsaturation, and optionally, in one or the other case, an activation catalyst for the above-mentioned crosslinking reaction, and it is hardened by heating or by exposure to ultraviolet or electronic radiation.

According to an advantageous embodiment of the invention, the above-mentioned second layer of silicone comprises at least a polyorganosiloxane and, advantageously, a polydimethylsiloxane with acrylate and/or epoxy function, and optionally an activation catalyst.

According to another advantageous embodiment of the invention, the second layer of silicone comprises a polydimethylsiloxane with acrylate function and a catalyst of the ketone type, advantageously of the benzophenone type, or it comprises a polydimethylsiloxane with epoxy function and a catalyst of the iodonium salt type, and it is hardened by exposure to ultraviolet radiation.

According to yet another advantageous embodiment, the second layer of silicone comprises no activation catalyst and it is hardened by exposure to electronic radiation.

The invention also concerns the three dimensionally microstructured films, and the self-adhesive films which comprise a surface such as one which has been three dimensionally microstructured by the above-mentioned method, notably one comprising motifs which can be used for decorative, publicity or other purposes, notably on the surface opposite the adhesive surface of the self-adhesive films.

As already indicated above, to form a three-dimensional microstructure on a flat surface of a support, such as a flexible support like paper or a plastic film, one applies a first layer of silicone substantially flat and uniform on said surface of support and one applies on the first layer of silicone a second layer of silicone which has been three dimensionally structured, in such a manner that these layers of silicone become integrally connected to thus form a common three-dimensional microstructure ensuring anti-adhesive properties on the surface of the support. Thus any flexible surface of substrate, in particular any surface of adhesive, deposited on both the integrally connected layers of silicone will be microstructured by inverse replication of the three-dimensional microstructure formed by the latter.

According to a particularly preferred embodiment of the invention, to confer a three-dimensional microstructure to a flexible surface of substrate, and in particular to a surface of adhesive, one applies a continuous first layer of silicone which is substantially flat and uniform on a surface of a support, such as one made of paper, which may, for example, be calendered or sized, or a plastic film, such as one made of polyethylene, polyester, polypropylene, polyvinyl chloride, polyamide or a similar material, and one applies to the first layer of silicone a second layer of silicone which has been three dimensionally structured, in such a manner as further described below that these layers of silicone become integrally connected to thus form a common three-dimensional microstructure ensuring anti-adhesive properties which are distributed evenly on the surface of the support. Then, one deposits by means well known in the art. e.g. by coating and/or lamination the flexible surface of substrate, or, in particular, the above-mentioned surface of adhesive, on the layers of silicone in such a manner that said surface of substrate, in particular of adhesive, is microstructured by inverse replication of the common three-dimensional microstructure formed by the first and the second layer of silicone. In this regard, the expression "microstructured by inverse replication" refers to the fact that the topography obtained on the surface of the flexible substrate, in particular of the adhesive, is the inverse motif of the surface topography formed by the combination of the first layer and the second layer of silicone, whose three dimensions in space are substantially similar or similar to the latter.

Throughout the present description as well as in the claims, the term "substrate" denotes any product which will be microstructured by inverse replication of the microstructure formed by the combination of the first layer of silicone and the second layer of silicone and the term "support" will denote any product to which the first layer of silicone or layer of silicone which is substantially flat and uniform is applied.

The first substantially flat and uniform layer of silicone is formed from a composition of silicone which is based on one or more functionalized polyorganosiloxanes (POS) with groups

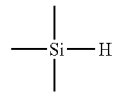

as crosslinking agent, and from one or more functionalized polyorganosiloxanes (base resin) which can react with the crosslinking agent by polycondensation in the presence of a solvent, and preferably of a tin based activation catalyst, except in the case of hardening of the layer by exposure to electronic radiation. In a variant, one could use as base resin one or more functionalized polyorganosiloxanes with groups

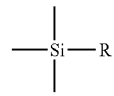

which can react with a crosslinking agent by polyaddition with or without solvent, where R comprises at least one ethylenic unsaturation, preferably a vinylic unsaturation, in the presence of platinum and/or rhodium catalyst.

This composition of silicone moreover can comprise additives such as those which are conventionally used in this type of application, namely an adhesion modulator, for example, based on a silicone resin comprising siloxyl units, reaction accelerators and inhibitors, pigments, surfactants, fillers or similar substances. To facilitate the application of the layer of silicone, the composition of silicone mentioned above can be liquid and diluted in a solvent such as hexane or toluene and, for reasons pertaining to hygiene and safety, it can be in the form of an aqueous dispersion/emulsion. The expression "flat and uniform" denotes the fact that the layer of silicone comprises no surface asperities or roughness which could tarnish the flat configuration of its surface, i.e. the silicone layer will tend to wet out and be continuous over a support surface without having any disruptions that would interfere with the ultimately desired release characteristics or 3 dimensional topography of the siliconized support following the application of the second layer. This composition of silicone constituting the first layer, which is either made of a solvent base or without solvent, is hardened by crosslinking with heating in a reaction of polyaddition or polycondensation, for example, by being subjected to temperatures of 70-220° C., advantageously 100-180° C., or under exposure to radiation energy, such as ultraviolet or electronic radiation. In the case of a thermal treatment, the layer of silicone can be hardened by passing the support to which it is applied through thermal ovens whose temperature can vary from 100-220° C., with a residence time in the thermal oven which can range from 2 sec to one minute. The coating rate is generally determined by the temperature profile in the ovens and by the length of the ovens. In the case of a treatment under radiation energy, the silicone layer is brought into a UV oven or an oven with electronic radiation and it is hardened nearly instantaneously; however, the composition of silicone of the radical or cationic type does not require the presence of a catalyst during exposure to an electronic radiation. The flat layer of silicone may have a thickness of 0.4-1.6 μm, advantageously 0.7-1.2 μm. This silicone layer, in general, is applied with a five-roller system for the compositions without solvent and with a system of the type with coating roller and Mayer doctor bar for the compositions with a solvent or aqueous base. Thicker or thinner first layers of silicone may be used if desired. However, thicker layers have a greater material expense, and thinner layers may require greater care in formation to avoid undesirable disruptions in coverage over the support. It will be appreciated that the first layer of silicone itself may be built up by application of multiple coats of silicone and that the formulation of each coat may vary, however for ease of manufacture a single coat may be applied.

According to the present invention, the second layer of silicone or three dimensionally microstructured layer of silicone is formed from a composition of silicone comprising one or more polyorganosiloxanes and, advantageously, one or more polydimethylsiloxanes with acrylate and/or epoxy function, and optionally an activation catalyst as a function of need. This composition of silicone is without solvent and it is hardened either by exposure to ultraviolet radiation (polydimethylsiloxane with acrylate and/or epoxy function) or by exposure to electronic radiation (polydimethylsiloxane with acrylate function), in which case it does not require the presence of an activation catalyst. A suitable UV dose to ensure a correct crosslinking of the silicone is generally greater than 700 mJ/cm$^2$. When the composition of silicone comprises one or more polydimethylsiloxanes with acrylate function, and the microstructured layer of silicone is hardened by UV radiation (radical system), one may use, as catalyst, a ketone photoinitiator, advantageously of the benzophenone type, a specific example being 2-hydroxy-2-methyl-1-phenylpropanone. To optimize the adhesion of the microstructured layer to the first silicone layer, one can incorporate an adhesion agent such as polydimethylsiloxane dipropoxylated diglycidyl ether. In the case where the composition of silicone comprises one or more polydimethylsiloxanes with epoxy function one uses, as catalyst, a photoinitiator of the iodonium type such as diaryliodonium tetrakis (pentafluorophenyl) borate or iodonium hexafluoroantimonate (cationic system). In general, the radical systems are preferred over the cationic systems, because they possess a better stability of the anti-adhesive (substrate release) properties over time while, however, requiring the presence of a system for rendering inert with nitrogen during the crosslinking reaction to lower the oxygen level in the gas atmosphere to less than 50 ppm. Like the first layer of silicone, the composition of silicone used to form the second microstructured layer can contain other additives, such as fillers, accelerators, inhibitors, pigments and surfactants. The coating of the microstructured layer of silicone is generally carried out using an engraved cylinder. Suitable coating speeds of 10-600 m/min may be used. The quantity of silicone (polydimethylsiloxane) will vary as a function of the engraving of the cylinder, the viscosity of the composition, the viscosity of the addition products which can modify the rheological behavior of the layer of silicone, and as a function of the temperature of the silicone. In fact, the silicone is transferred from a roller which is engraved onto the surface of the first layer of silicone to be coated. The engraving of the engraved cylinder is filled by immersion into an ink fountain or receptacle containing silicone. The excess silicone is generally eliminated by means of a doctor bar. A rubber counter roller will be used to ensure the correct transfer of the layer of silicone. The engraving of the cylinder will determine the topography of the layer of silicone, that is the desired three-dimensional microstructure. The quantity of silicone deposited may be controlled and can vary e.g. from 3 to 25 g/m$^2$, advantageously from 4 to 15 g/m$^2$. The three-dimensional microstructure formed by the combination of the first layer and the second layer of silicone advantageously consists of microstructured units, for example, micro-honeycombed, ridged, or grid shaped motifs, whose crest height can be predetermined. Beneficially, crest heights of 3-50 μm, advantageously 5-25 μm, may be used. For example, the engraving used can present the following characteristics: shape: truncated pyramidal, depth (height): 50 μm, opening: 100 μm, diagonal measurement of the pyramid: 500 μm, theoretical volume: 15 cm$^3$/m$^2$. The microstructured layer of silicone which is applied to the flat surface of the first layer of silicone should be crosslinked as rapidly as possible e.g. by UV radiation or electron beam, and thus, in the case of treatment by UV, the UV lamps are positioned preferably as close as possible to the siliconization station (where the second layer is applied to the first layer). The power of the UV lamps can range from 120 W/cm to 240 W/cm or more, and it may determine the speed of coating of the microstructured silicone (approximately 100 m/min at 120 W/cm may be achieved). During the coating of the microstructured silicone with the help of a special engraved cylinder (so-called "inverse or negative" engraving) on the flat layer of silicone, the latter must be deposited first on the support e.g. of paper or plastic, or during a separate coating (presiliconization process), or in tandem, that is on the machine which is in the process of coating the microstructured layer of silicone. The coating of the microstructured layer of silicone can also be carried out using a rotating sieve, in which case the silicone is passed through the sieve in contact with the surface to be coated of the first layer. For example, the sieve which is used can have the following characteristics: a 30 mesh sieve; thickness of 200 μm, 15% of opening surface, dimension of the holes of 345 μm, theoretical volume of the fluid of silicone passing through: 30 cm$^3$/m$^2$. These parameters are exemplary and may be varied as desired. It is not recommended to crosslink the microstructured layer by the thermal route, because the temperature required for the crosslinking would destroy its three-dimensional structure as a result of flowage even before it can be fixed by crosslinking. In addition, another drawback from the point of view of the resistance of the spatial structure of the motif during its coating would be that the viscosity of a composition of silicone which has been treated by the thermal route would be on the order of 200400 mPa·s, while, if treated by radiation, it would be greater than 1000 mPa·s.

If one coats silicone onto a support, such as paper, polyester or another material, the surface tension of these supports in general is always higher than the surface tension of the silicone. The resulting immediate consequence is that the silicone will wet the surface of the support and thus spread on it. Conversely, if one coats silicone on a surface which presents a surface tension which is less than that of the silicone, such as, for example, a surface which has been treated with fluorine, one will then observe a retraction of the silicone which can lead to dewetting; the liquid film of silicone breaks on the surface of the support to form a group of droplets which are separated from each other. Since it is absolutely necessary to avoid any deformation of the three-dimensional structure of the silicone when it has just been deposited on the surface of the support, the surface of the support ideally should have the same surface tension as the silicone which is deposited on it and thus ideally a surface of the same nature as silicone: a siliconated surface. In this case, the silicone which one coats will not tend theoretically to retract or spread. Normally, its structure will thus remain stable (except for the effect of gravity on the faces of the three-dimensional structure which will depend to a large extent on the viscosity of the silicone which one coats. The higher it is, the better) in the UV or electronic radiation station, where the microstructured layer of silicone will be definitively fixed by crosslinking. The surface tensions of the silicone layers are 19-24 mN/m (or dyne/cm), advantageously 21-23 mN/m. The method which is generally used to determine the surface tension is the Owens-Wendt drop method with three components (liquids used: hexadecane, water, glycerol, diiodomethane; measurement temperature: 23° C.). One notes that there is very little difference from the point of surface tension between the silicone compositions, whether they are treated by the thermal route or by radiation. A layer of silicone which has been treated with heat will have substantially the same surface tension as a silicone layer which has been treated by UV radiation. The microstructured layer of silicone can consequently be applied easily to the flat surface of a layer of silicone which has been crosslinked thermally.

According to the invention, one then deposits the second layer of silicone onto the first layer of silicone which then becomes integrally connected to thus form a common three-dimensional microstructure ensuring anti-adhesive (substrate release) properties which are evenly distributed on the surface of the support, and onto that siliconized support a liquid solution or paste is deposited which, after drying by the thermal route, for example, in thermal ovens, or under exposure to UV or electron beam radiation, will form a flexible substrate or film whose surface topography is substantially the inverse topography of that of the three dimensionally microstructured silicone. Indeed, the layers of silicone fulfill a double role; the role of imposing an inverse topography on the surface of a film which will be made in close contact with them and that of an anti-adhesive agent which will facilitate the separation of the film made from the material which was applied to the microstructured silicone. As flexible film to be made, any plastic film can be appropriate, for example, cast polyvinyl chloride or a film made of a solvent base, or in the form of an organosol or plastisol. Other cast films could also be considered, such as polypropylene, polyurethane, and polyethylene. Indeed, the principal objective of the method of the invention is to confer to the cast film a surface finish by micro-replication, for example, for the visual aspect or for various technical reasons.

According to a particularly advantageous embodiment of the invention, one uses as a substrate a flexible film such as a plastic film, for example, a polyvinyl chloride film, whose surface is covered with an adhesive, so as to confer to the adhesive a microstructure which corresponds to the inverse image of the microstructured silicone. The layer of adhesive, in that case, will advantageously be coated directly on the microstructured silicone, or pressed on the silicone by lamination using a lamination device. During a direct coating, the adhesive will be in liquid form, for example, in solution in an organic solvent or a mixture of organic solvents or in an emulsion in water, or in the form of a solid, that is in the form of an adhesive without solvent which is hot cast on the microstructured silicone. Since the coating process used to coat the adhesive on the silicone must be such that it does not affect the microstructure of the silicone by abrasion, the latter process is preferably carried out using a slit extruder, a coating roller equipped with a scraper or a doctor bar. As adhesive type one could use any of the adhesives which are applicable in the field considered. In this regard, mention is made of the adhesives based on acrylic, rubber, silicone, and polyurethane. These adhesives can be solvent based, water based, or without solvent, in the molten state. The choice of the adhesive will determine the ease of replicating the microstructure of the silicone and the more or less permanent maintenance of its inverse microstructure when the substrate containing the microstructured adhesive is later applied to a given object, such as a display window, painted canvas, or a panel. Particularly well suited are the self adhesive resins which self crosslink when heated, and are based on an acrylic copolymer dissolved in a mixture of organic solvents, the self adhesive resins which can be crosslinked by the addition of isocyanate, and are based on an acrylic copolymer dissolved in a mixture of organic solvents, the acrylic copolymers in an aqueous dispersion, where the acrylic monomers for this purpose are preferably 2-ethylhexyl acrylate, butyl acrylate and acrylic acid, and the adhesives based on natural and/or synthetic rubber, which may or may not be dissolved in a mixture of organic solvents. These adhesives can contain one or more additives, such as resins which ensure gluing, antioxidants, plasticizers, fillers, pigments or similar substances.

To clarify the invention, FIG. 1 in the drawing of the appendix represents a slightly enlarged cross-sectional view of a support 1 to which a flat first layer of silicone 2 and microstructured second layer of silicone 3 have been applied, respectively. As one can see, the first and second layers 2 and 3 and support 1 are adhered together to form a unitary three-dimensional microstructure 4. This microstructure 4 comprises a plurality of crests or ridges that consist of the microstructured layer 3 fixed to support 1 via the first layer 2. Together the first silicone layer 2 and the second silicone layer 3 form a continuous siliconized surface 5 on support 1. The siliconized surface 5 has anti-adhesive properties which extend from bottom zones 5a continuously over crest zones 5b to provide a surface adapted to release a substrate in contact therewith. The plurality of crests or ridges are preferably distributed evenly over the siliconized surface 2a of the support 1, and facilitate the separation of a substrate film (see FIG. 7) with or without adhesive which will have been deposited on the microstructured silicone.

The following tests and examples better illustrate the invention although they in no case limit it.

Tests on a Pilot Installation

The materials used, the operating conditions and the results of the tests are given in Tables 1 and 2 below.

1. Coating of a "Grid" of Silicone on Presiliconated Paper

The coating of the microstructured ("grid shaped") layer of silicone is carried out by "inverse" engraving, that is by pyramids on the table of the cylinder. These pyramids may have a truncated shape or be similar to a pyramid having its apex removed in a cylindrical fashion.

Characteristics of the engraving (see FIG. 2a: plan view of the engraving, and FIG. 2b: cross-sectional view along line 11b).

Cylinder No. 58472 chrome coated
Depth: 0.050 mm.
Opening: 0.100 mm
Diagonal measurement of the pyramid: 0.500 mm.
Bottom: 0.015 mm.

The filling of the engraving is carried out either using a closed chamber equipped with doctor bars, or by immersion of the engraving in the silicone bath, where the excess silicone on the surface of the engraving is then eliminated with a doctor bar (made of steel, nylon or any other material). The fixation of the microstructured layer of silicone is carried out using a battery of mercury UV lamps with average pressure and a power of 200 Wm.

TABLE 1

Siliconization (with engraved roller and closed chamber)

| Test | Support/ presiliconization | Silicone/ catalyst | Speed m/min | Rendering inert with N2 | Pressure engraving/ rubber counter roller | Silicone attachment | Results (appearance) |
|---|---|---|---|---|---|---|---|
| 1 | Signback 13[1] R630GE (SS)[2] | UV902G[5] Visco = 800 cps* | 50 | <20 ppm O2 | 2 bar | Slight peeling by friction | Transfer of the silicone plate, increase the pressure of the engraving/rubber counter roller |
| 2 | Signback 13 (R630GE (SS) | VU902G Visco = 800 cps* | 50 | <20 ppm O2 | 4 bar | Slight peeling by friction | Total transfer of the silicone plate |
| 3 | Signback 13 R630GE (SS) | UV902G Visco = 800 cps* | 100 | <20 ppm O2 | 4 bar | Slight peeling with friction | Total transfer of the silicone plate |
| 4 | Signback 13 UV902G (+cra 709)[3] | UV902G Visco = 800 cps* | 50 | <20 ppm O2 | 4 bar | Perfect | Total transfer of the silicone plate |
| 5 | Signback 13 UV PC900RP[4] | UV902G Visco = 800 cps* | 50 | <20 ppm O2 | 4 bar | Perfect | Total transfer of the silicone plate |
| 6 | Signback 13 UV PC900RP | UV PC900RP Visco = 1200 cps* | 50 | <20 ppm O2 | 4 bar | Perfect | Total transfer of the silicone plate |

*The Brookfield viscosity of the silicones was measured (spindle 4, speed 20 rpm), unit the centipoise = one mPa · s.
[1] Signback 13 is a sized paper with kaolin of 130 g/m².
[2] R630GE (SS) is a mixture of polyorganosiloxanes with Pt catalyst, without solvent.
[3] UV902G (+CRA 709) is a mixture of polyorganosiloxanes comprising acrylate functions, and it is placed in the presence of 2-hydroxy-2-methyl-1-phenylpropanone as photoinitiator, from the company Goldschmidt.
[4] UVPC 900 RP is a mixture of polyorganosiloxanes comprising acrylate functions, and it is placed in the presence of 2-hydroxy-2-methyl-1-phenylpropanone, from the company Rhodia.
[5] UV 902G is a mixture of polydimethylsiloxanes functionalized with acrylate function and of 2-hydroxy-2-methyl-1-phenylpropanone from the company Goldschmidt..

2. Coating of the Adhesive

Formulation of adhesive used:
Acrylic copolymer in solution in a mixture of organic solvents: 17 kg.
Butyl acetate (principal solvent): 2.8 kg.
Crosslinking agent: 0.160 kg.
Drying temperature profile: 60° C., 80° C., 100° C., 120° C.
Coating speed: 20 m/min.
Gram weight of the adhesive: 20-25 g/m².

TABLE 2

Coating of the adhesive

| Example No. | Adhesive | Face | Results (appearance) |
|---|---|---|---|
| 1 | Acrylic copolymer in solvent | M8129[1] | Acceptable spreading of the adhesive |
| 2 | Acrylic copolymer in solvent | M8129 | Good spreading of the adhesive |
| 3 | Acrylic copolymer in solvent | M8129 | Good spreading of the adhesive |
| 4 | Acrylic copolymer in solvent | M8129 | Acceptable spreading of the adhesive |

[1] M8129 is a sheet of glossy white PVC having a thickness 90 μm.

One can thus see that the coating of a silicone relief via so-called inverse engraving yields excellent results.

According to this known method, the layer of silicone, deposited on the glossy face of the polyethylene film of a two-faced polyethylenated paper, is microembossed with heating (110° C.) and at low speed (0.9 m/min) by an engraved cylinder; the counter cylinder is a silicone rubber roller which has a Shore hardness of 85 and is heated at 120° C.; the pressure exerted between the two cylinders is 22 N/mm².

Figure 1:
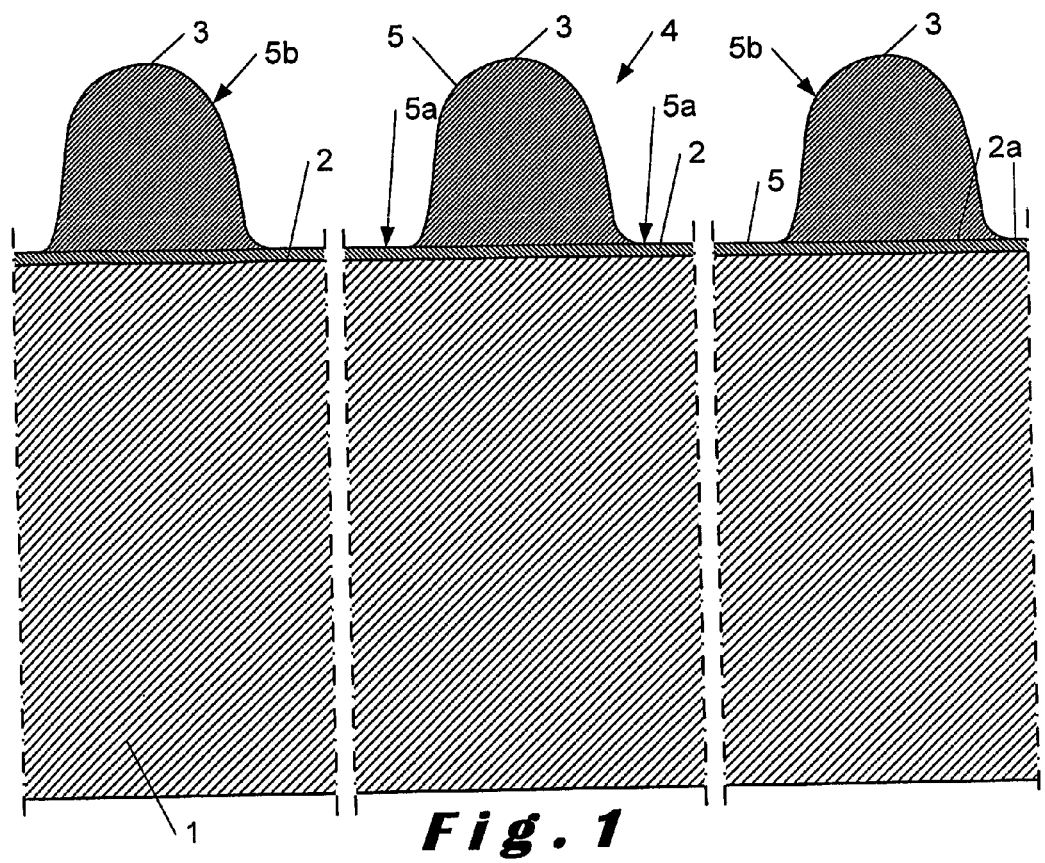
Figure 2A:
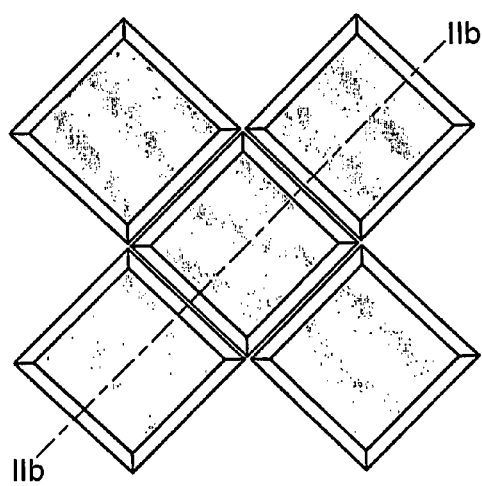
Figure 2B:
Figure 3:
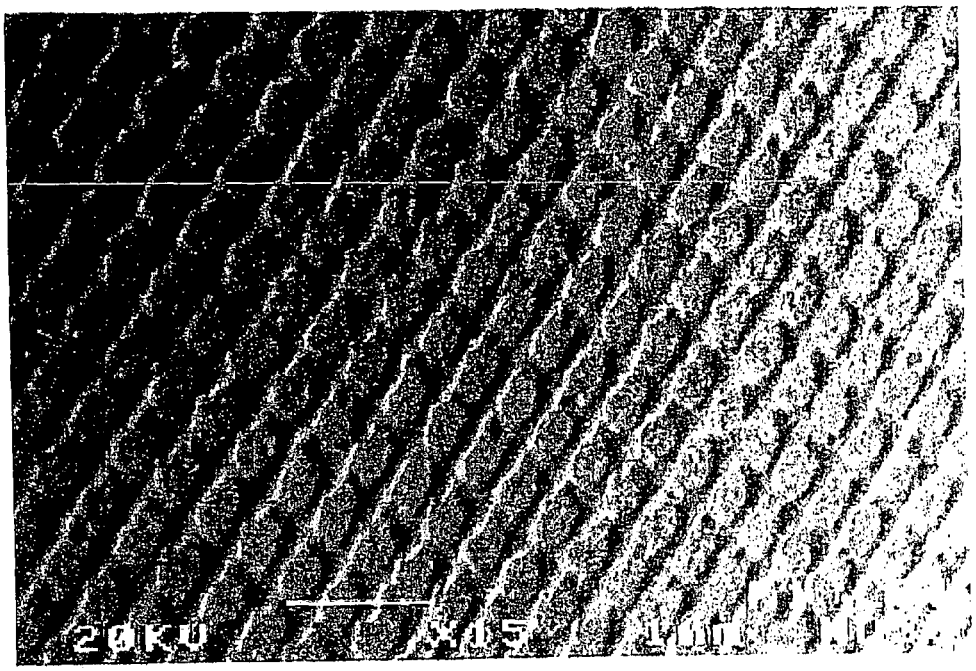
FIG. 3 is a scanning electron micrograph of the microstructured surface of silicone of Example No. 2 according to the invention (magnification ×15 and ×30).
Figure 3:
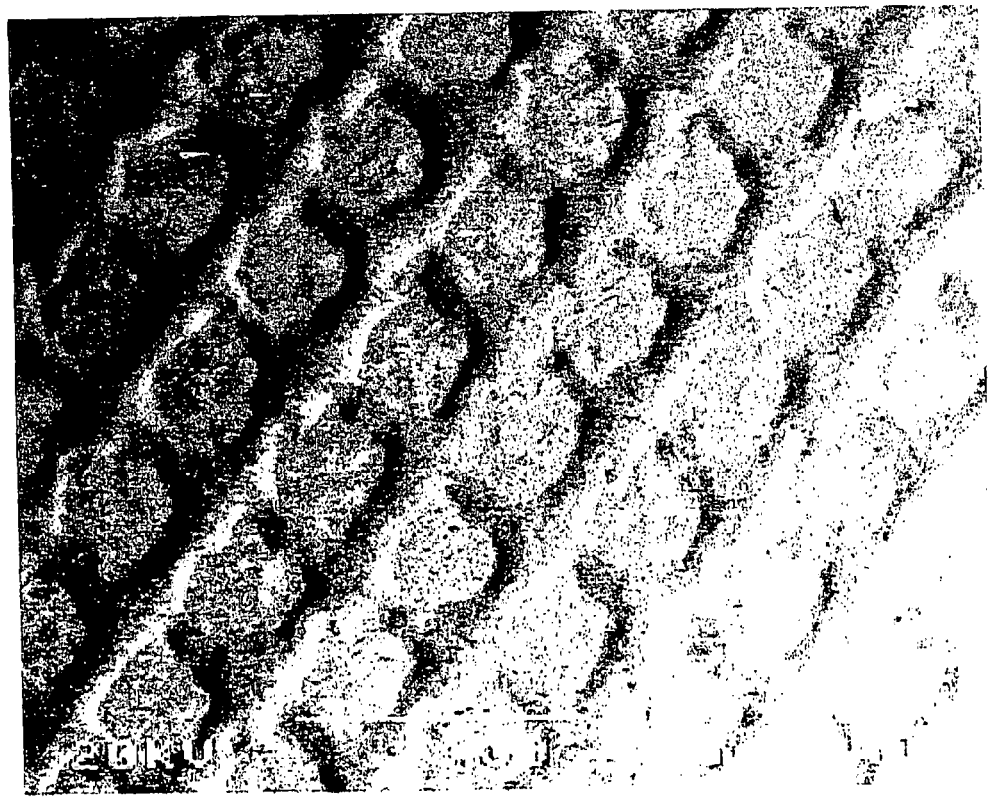
Figure 4:
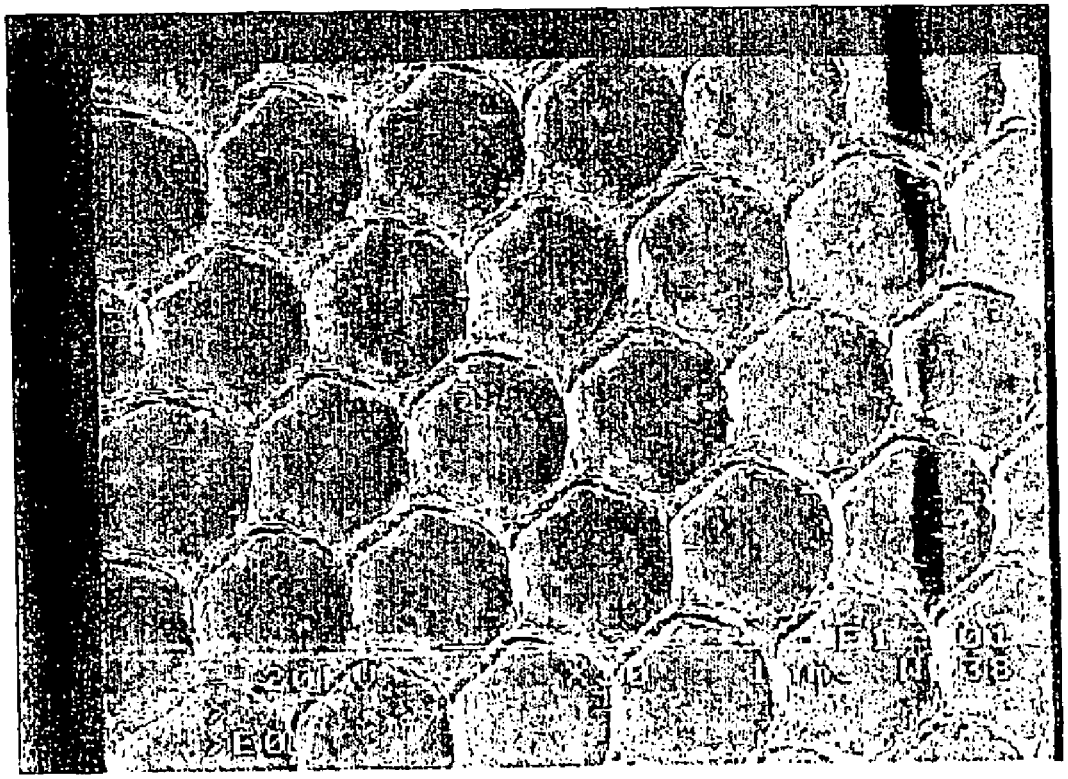
FIG. 4 is a scanning electron micrograph of the microstructured surface of silicone obtained by a known method of the prior art.

As one can note, the inventive microstructured support has on the surface of the silicone (FIG. 3) very regular features which are rounded at the level of the crests, which prevents or reduces the possibility of transfer of the image of the silicone pattern to the surface of the substrate e.g. a flexible film of PVC, that is there is no alteration in the surface appearance of the substrate film. This is not the case with the micro-honeycombs of FIG. 4, where the surface of the substrate PVC film is altered by the microstructures of the polyethylenated and siliconated paper whose embossed crests are much sharper and less rounded; the micro-honeycombed pattern is visible through the PVC film which the crests deform. To ameliorate this pattern transfer through to the substrate, the prior art may use a thicker substrate to lessen or blunt the image transfer. Advantageously, preferred embodiments of the present invention use rounded microstructured crests or ridges which lessen or prevent silicone crest pattern transfer through to a substrates distal surface. Thus, the microstructured support of the present invention may by inverse replication define the topography of the adjacent proximate surface of the substrate while not transferring a visible (to the naked eye) image through to the distal surface of the substrate. This means that use of thinner substrates or facestocks may be possible e.g. 60 ìm, 50ìm, or 40 ìm or less may possibly be used thereby effecting a material cost savings since it is unnecessary to use an added thickness to lessen the visual effect caused by using a patterned silicone liner having sharp crests.

Other tests and test results are given in Tables 3 and 4 below.

1. Coating of a Grid of Silicone on Presiliconated Paper

The operating procedure is substantially the same as the one used above.

2. Coating of the Adhesive

Formulations of adhesive used:

1. MP 500 (Solucryl 340: acrylic copolymer in solution in a mixture of organic solvents).

Gram weight: 24.5 g/m$^2$

Viscosity: 135 cps (spindle 4, v20, Brookfield)

Drying temperature profile: 70° C., 90° C., 110° C., 140° C.

Coating speed: 10 m/min.

2. MR 980 (Solucryl 615: acrylic copolymer in solution in a mixture of organic solvents).

Gram weight: 16 g/m$^2$

Viscosity: 790 cps (spindle 4, v20, Brookfield)

TABLE 3

Siliconization (with engraved roller and doctor bar)

| Test | Support/ presiliconization | Silicone/ catalyst | Speed m/min | Rendering inert with N2 | Pressure engraving/ rubber counter roller | Silicone attachment | Results (appearance) |
|---|---|---|---|---|---|---|---|
| 1 | Signback 13 R630GE (SS) | UV902G | 50 | <20 ppm O2 | 4 bar | Slight peeling by friction | Total transfer of the silicone plate |
| 2 | Signback 13 UV902G | VU902G | 50 | <20 ppm O2 | 4 bar | Slight peeling by friction | Total transfer of the silicone plate |
| 3 | Signback 13 UV PC900RP | UV902G | 50 | <20 ppm O2 | 4 bar | Perfect | Total transfer of the silicone plate |
| 4 | PET 29μ treated RF 310 RP (1, 6) | UV902G | 50 | <20 ppm O2 | 4 bar | Slight peeling by friction | Total transfer of the silicone plate |

R630RP: mixture of polyorganosiloxanes without solvent from Rhodia
RF310RP: mixture of polyorganosiloxanes without solvent from Rhodia
UV902G: see Table 1 (viscosity 800 cps, spindle 4, v20).
UV PC900RP: see Table 1

Drying temperature profile: 70° C., 90° C., 110° C., 190° C.

Coating speed: 20 m/min.

TABLE 4

Coating of the adhesive

| Example No. | Presiliconated paper | Silicone | Adhesive | Face | Results (appearance) |
|---|---|---|---|---|---|
| Reference A | SIGNBACK 13 UV PC900RP | / | MP500 | M9829 polymer 75μ | Good coating of the adhesive |
| 5 | SIGNBACK 13 R630GE (SS) | UV902G | MP500 | M9829 | Good coating of the adhesive, a few bubbles |
| 6 | SIGNBACK 13 UV PC902G | UV902G | MP500 | M9829 | Good coating of the adhesive, very few bubbles |
| 7 | SIGNBACK 13 UV PC900RP | UV902G | MP500 | M9829 | Good coating of the adhesive, a few bubbles |
| 8 | SIGNBACK 13 UV PC900RP | UV902G | MP500 | M2629 polymer 60μ | Good coating of the adhesive, a few bubbles |

TABLE 4-continued

| | | Coating of the adhesive | | | |
|---|---|---|---|---|---|
| Example No. | Presiliconated paper | Silicone | Adhesive | Face | Results (appearance) |
| 9 | SIGNBACK 13 R630GE (SS) | UV902G | MP500 | M2629 | Good coating of the adhesive, a few bubbles |
| 10 | SIGNBACK 13 UV902G | UV902G | MP500 | M2629 | Good coating of the adhesive, very few bubbles |
| 11 | PET 28μ treated RF310RP (1, 6) | UV902G | MP500 | BOPP 58μ clear | Good coating of the adhesive, very few bubbles |
| Reference B | SIGNBACK 13 UV PC900RP | / | MP500 | M2629 | Good coating of the adhesive |
| Reference C | SIGNBACK 13 UV PC900RP | / | MR980 | M2629 | Good coating of the adhesive |
| 12 | SIGNBACK 13 R630GE (SS) | UV902G | | M2629 | Good coating of the adhesive, very few bubbles |
| 13 | UV902G | UV902G | MR980 | M2629 | Perfect coating of the adhesive, no bubbles |
| 14 | SIGNBACK 13 UV PC900RP | UV902G | MR980 | M2629 | Good coating of the adhesive, very few bubbles |
| 15 | SIGNBACK 13 UV PC900RP | UV902G | MR980 | M9829 | Good coating of the adhesive, very few bubbles |
| 16 | SIGNBACK 13 R630GE (SS) | UV902G | MR980 | M9829 | Good coating of the adhesive, very few bubbles |
| 17 | SIGNBACK 13 UV902G | UV902G | MR980 | M9829 | Perfect coating of the adhesive, no bubbles |
| Reference D | SIGNBACK 13 UV PC900RP | / | MR980 | M9829 | Good coating of the adhesive |

One notes that even with a very thin substrate facestock (face) of flexible PVC film of 60 μm thickness (M2629), one does not see the silicone pattern image transferring through.

Tests of Industrial Application

1. Coating of Silicone with "Inverse" Engraving, and Polyester Doctor Bar.

The material used, the operating conditions and the results of the tests are given in Table 5 below.

The coating of the microstructured layer of silicone is thus carried out by inverse engraving, that is by pyramids on the table of the cylinder.

Characteristics of the engraving:

| Cylinder chrome coated | |
|---|---|
| Depth | 0.050 mm |
| Width | 530 mm |
| Opening | 0.100 mm |
| Diagonal measurment of the pyramid | 0.500 mm |
| Bottom | 0.015 mm |

The fixation of the microstructured layer of silicone is carried out by using 2 Hg arc-lamps with a power of 120 W/cm under an inerting atmosphere of $N_2$ (<20 ppm of $O_2$).

TABLE 5

| | | | | Siliconization with engraved roller and polyester doctor bar | | | | | |
|---|---|---|---|---|---|---|---|---|---|
| Test | Face | Adhesive (slot die) | Silicone (gravure) | Sized paper 130 g/m² presiliconized | Speed m/min | Rendering inert with N2 | Presure engraving/ rubber counter roller | Silicone attachment | Results (appearance) |
| 1 (contol) | PVC cast black 50 μm | MP673HR 34 g/m² | / | Silicone R625DC (0.9 g/m²) | 40 | / | / | perfect | / |
| 2 | PVC cast blue 50 μm | MP673HR 34 g/m² | UV902G 8 g/m² | Silicone R620DC (0.9 g/m²) | 40 | <20 ppm O₂ | 4 bars | perfect | Total transfer of the silicone plate |
| 3 | PVC white 60 μm | MP673HR 34 g/m² | UV902G 10 g/m² | Silicone R620DC (0.9 g/m²) | 40 | <20 ppm O₂ | 4 bars | perfect | Total transfer of the silicone plate |

TABLE 5-continued

Siliconization with engraved roller and polyester doctor bar

| Test | Face | Adhesive (slot die) | Silicone (gravure) | Sized paper 130 g/m² presiliconized | Speed m/min | Rendering inert with N2 | Presure engraving/ rubber counter roller | Silicone attachment | Results (appearance) |
|---|---|---|---|---|---|---|---|---|---|
| 4 | PVC white 60 µm | MP673HR 34 g/m² | UV902G 6.8 g/m² | Silicone R620DC (0.9 g/m²) | 40 | <20 ppm O₂ | 4 bars | perfect | Total transfer of the silicone plate |

R625DC/R620DC = Silicone system without solvent from Dow Corning.
UV902G = UV free radical crosslinking silicone system from Goldschmidt (viscosity brookfield 800 cps, spindle 4, speed 20 tours/min).

2. Coating of the Adhesive
Formulation of adhesive used:

| | |
|---|---|
| Resin | Solucryl 360 AB (acrylic copolymer); 720 kg |
| Solvent | Butyl acetate; 150 kg |
| Crosslinking agent | mixture of 2-pentanedione (1.5 kg), 3-isopropanol (0.8 kg), Ti acetyl acetonate (0.188 kg) and Al acetyl acetonate (2.02 kg). |
| Viscosity | 1300 cps (spindle 4, v20, brookfield). |

One . . . can thus see from Table 6 that like in the case of the tests on pilot installation the coating is carried out under excellent conditions, the adhesive performances and anti-adhesive values being substantially lower than those obtained with control test.

TABLE 6

Coating of the adhesive (appearance and characteristics)

| | | Adhesive performances | | | Anti-adhesive values | |
|---|---|---|---|---|---|---|
| | | Peeling inox plate (N/inch) | | Immediate adhesion inox plate | FTM3 300 mm/min Peeling off, face | FTM4 10 m/min |
| Test | Appearance of the adhesive | 24 h | 1 week | (N/inch) | N/2 inches | g/2 inches |
| 1 (control) | good coating | 17.9 | 20.59 | 15.65 | 0.56 | 64.2 |
| 2 | good coating | 13.11 | 15.45 | 12.05 | 0.18 | 20.4 |
| 3 | good coating | 14.38 | 15.28 | 14.85 | 0.24 | 32.2 |
| 4 | good coating | 13.61 | 15.48 | 13.83 | 0.27 | 33 |

Figure 5:
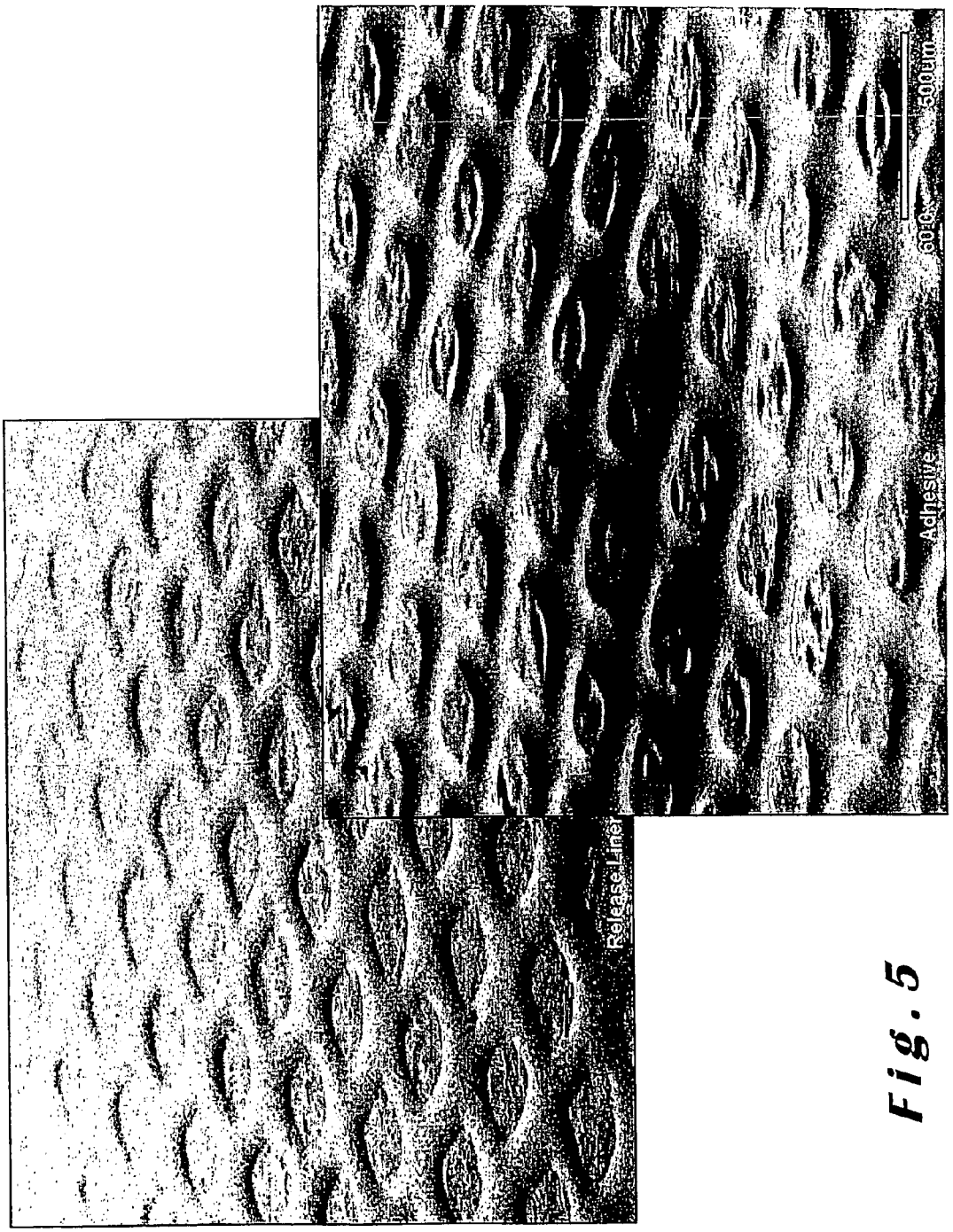

FIG. 5 is a scanning electron micrograph of the microstructured surface of silicone (top left side) and of an inversely replicated adhesive (bottom right side) obtained according to the method of the invention on industrial application (60× magnification with a 68° tilt).

Like in the case of the tests on pilot installation one can note that the microstructured crests are very smooth and the conjunction of rounded crests and of relatively small crest depth of about 10 µm, cooperates to greatly reduce and even prevent the visible transfer of the microstructured silicone pattern to the distal surface of the adhesive coated substrate of the flexible film of PVC. Advantageously, crest or ridge depths less than 15 µm may be used to help lessen or prevent the undesirable visual effect.

Figure 6:
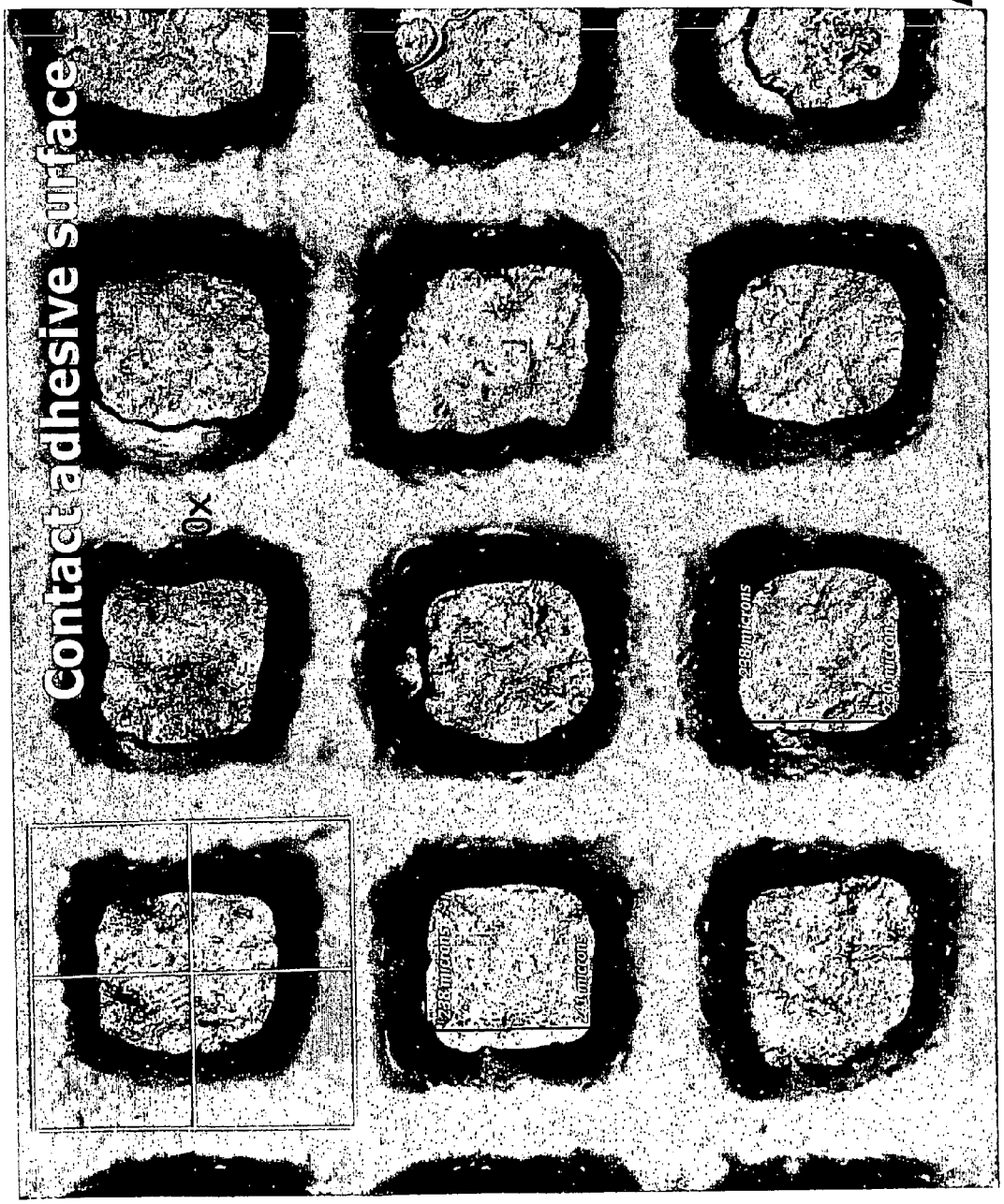

FIG. 6 is a scanning electron micrograph of the initial contact topography between the adhesive surface and the surface of the substrate support which receives the self-adhesive film microstructured according to the method of the invention. As one can clearly note from this micrograph, and more particularly from the plate crest bordered and divided into four squares of the same surface, the percentage of initial contact area may be made substantially lower than the values obtained with the microstructured adhesives known to date, which are higher than 35%. Here, the contact area is about 25%. Depending on the appearance of the adhesives used, the composition thereof and the processing conditions, the percentages of initial contact surface between the adhesive layer and the substrate support may vary and in one preferred embodiment are from 15 to 32%, and preferably of 23 to 28% of the total covering surface. In these preferred embodiments this low level of contact surface allows for better repositioning properties of the adhesive film than the adhesive films of the prior art, in conjunction with good adhesion between the surface of the substrate and a supporting object to which it is applied, because the adhesive surface at the top of the crests is substantially planar and will give by microreplication a plane microplateau. Furthermore, the presence of so formed microchannels of small depth (of about 10 µm) and the high immediate non contact adhesive surface (of about 70% or more) provides to the self-adhesive product a repositionable character in the case of the initial application pressure is low. Now, if a higher pressure is exerted upon the applied adhesive film, said film is immediately fixed to the surface of a supporting object because all the planar surfaces of the crests of adhesive in the form of plane plateau are then in full contact with the object surface. The microchannels formed by the adhesive contact with the object surface and circumscribed by the object surface and the substrate's immediate non contact adhesive surfaces have a depth which allows an easy egress and elimination of the pockets of air which could occur at the interface of adhesion during the application of the self-adhesive product. The simple contact of the hand on the locations where the pockets of air are formed can cause the rapid and complete suppression or expulsion of these pockets of air. If a greater pressure is then exerted, the plane surfaces of the different plateau of adhesive can extend substantially to the plane valleys of the first layer of silicone depending on the exerted pressure, the viscoelasticity properties of the adhesive, the time and the temperature to coalesce into a uniform and continuous surface (without the original microchannels) in close contact with the application (object).

Figure 7:
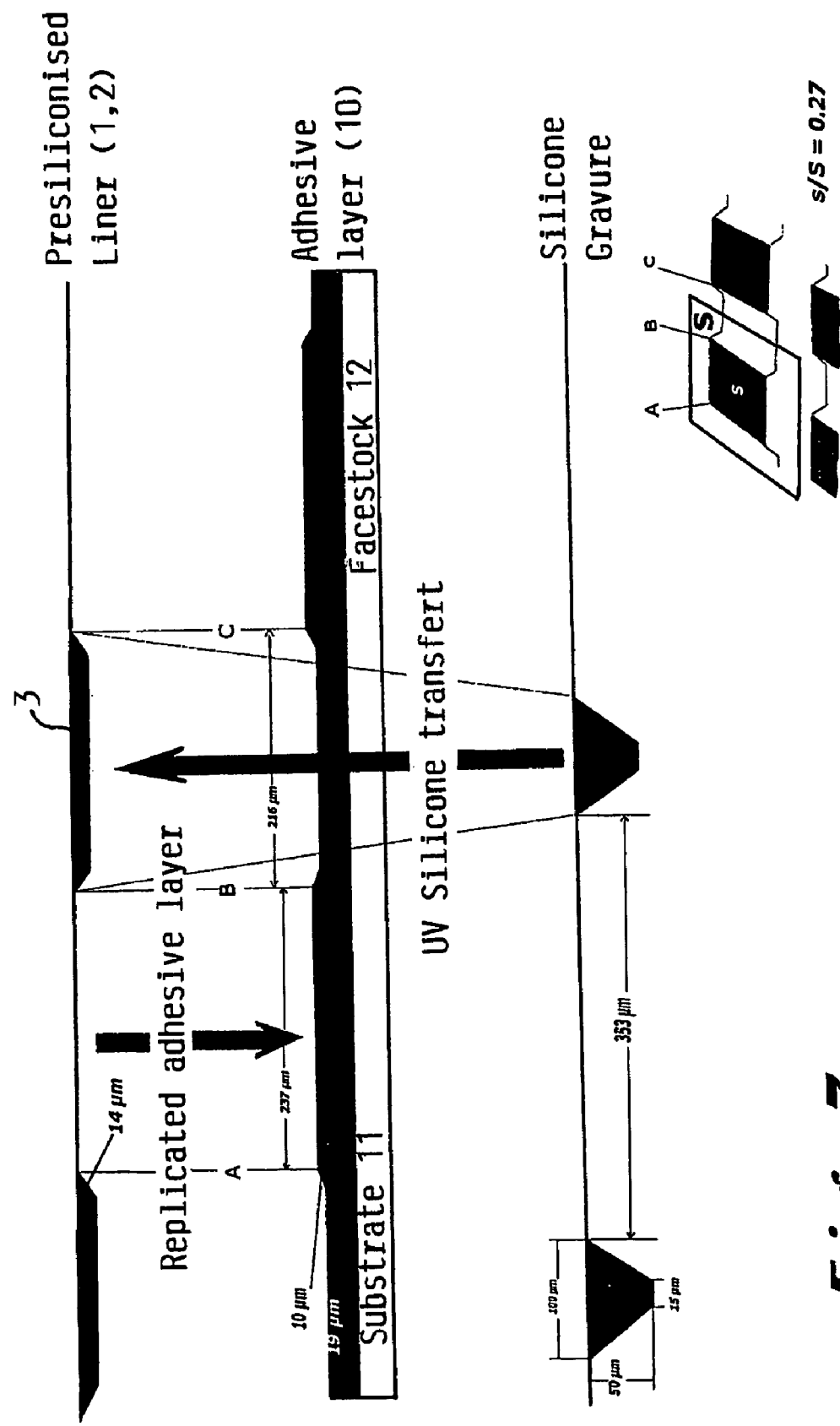

FIG. 7 is a diagrammatic representation in two dimensions of the process of the invention showing a presiliconised support (1, 2) on which a microstructured silicone layer 3 has been applied, hardenable by ultraviolet radiation, as well as an inverse replicated three-dimensional microstructure obtained on the adhesive layer 10 of substrate 11 when contacting the latter with the presiliconized liner (1,2) and the microstructured layer 3, and also a substrate 11 having a facestock 12.

As shown, one can note that the percentage of adhesive surface which will be immediately in contact with the surface on which the self-adhesive film will be applied is 27%, this percentage being calculated as follows:

$$\text{Distance } AB = 237 \, \mu m$$
$$\text{Distance } BC = 216 \, \mu m$$
$$s/S = \frac{237^2}{(237+216)^2} = 0.27$$

It should be also noted that the adhesion interface between the adhesive surface and the application surface is substantially planar because it corresponds to the valleys formed by the first flat layer of silicone of the three-dimensional microstructure.

Besides the already detailed advantage that one may obtain a microstructured surface of silicone on any type of substrate, such as a cellulosic or noncellulosic paper (calendered or glossy, sized), plastic films e.g. polyester, polyolefin, polyethylene, polypropylene, polyamide (uniaxially or biaxially oriented or unoriented, monolayer or multilayer, with or without printing or designs, colorants, processing aids, fillers and the commonly known additives) and the advantage that one can coat the silicone on a support web at a very high speed e.g. greater than 10 meters/minute (m/min), and preferably greater than 50 and even 300 m/min, the principal advantages of the microstructuring method of the invention are that one may obtain extremely regular microstructured motifs whose crests may be configured (e.g. small height and rounded) so as to not deform the substrate film (or facestock) on which the microreplicated surface of adhesive is applied.

The principal use of a microstructured adhesive is that it makes it easy to apply, for example, large emblems on given surfaces. Indeed, in general one has to remove and reapply the emblem to position it better and, once it is applied, one often has to eliminate pockets of air caught under the self-adhesive film during the application or pockets of gas which occur sometime after the application. The microstructured adhesive according to the present invention allows easy repositioning, easy elimination of bubbles during the application by simply applying manual pressure e.g. with one or more fingers or a hand, and it allows the elimination, through the microchannels formed, of any gas which may have been enclosed after the application.

It will be apparent from the foregoing that various inventive articles may be formed according to the present invention including a novel release liner, a novel pressure sensitive adhesive label having a release liner and that such articles may be employed in a wide variety of applications including in the production of very large graphic panels suitable for placement on buildings, vehicles and billboards. Such large graphic panels may have a width of 30, 50, 100 or 150 cm or more with a length usually at least as long or often 1, 2, 3 or many meters more in length. Such panels or sheets may often have a thickness of 1.25 millimeters (mm) or less.

One preferred embodiment of the invention is a multilayer sheet comprising:

(a) a flexible support comprising:
 (i) a sheetlike structure having a first broad surface and opposing second broad surface;
 (ii) a first layer of a silicone containing material e.g. in a sheetlike coating that is fixed to at least the first broad surface of the aforementioned sheetlike structure;
 (iii) a second layer of a silicone containing material fixed to the first layer (ii) as a plurality of ridges or crests thereby providing a flexible support having on at least one broad surface thereof a three dimensional topography of a plurality of ridges or crests; and (b) a flexible substrate having a proximate first surface and opposing distal second surface wherein the proximate first surface is in releasable contact with the three dimensional surface of the flexible support and the proximate first surface has a mating inversely replicated three dimensional topography.

The sheetlike structure of the flexible support is preferably not distorted into a plurality of ridges or crests corresponding to the second layer ridges or crests e.g. by embossing. Advantageously, the distal second surface of the flexible substrate is visually free from any ridge or crest pattern corresponding to the plurality of ridges or crests of the flexible support. The substrate may comprise a first adhesive layer forming a proximate first surface of the substrate and may optionally further comprise a first facestock layer in contact with the first adhesive layer and the facestock layer forming an opposing distal second surface of the substrate. The distal substrate surface may be printed e.g. using inks, pigments or colorants, with one or more images, indicia or designs or it may be unprinted, transparent, opaque, translucent, black, white or colored, either in part or over its entire surface. The distal surface of the substrate may also optionally have an additional exterior protective coating or layer applied thereto.

It should be understood that the invention is in no way limited to the described embodiments and that many modifications can be made to the latter without exceeding the context of the present patent.

The invention claimed is:

1. A multilayer sheet including:
 a. a first flexible support layer;
 b. a second layer comprising a flat and uniform layer of silicone containing material positioned on said first layer;
 c. a third layer comprising a three dimensionally microstructured layer of silicone containing material formed as a plurality of ridges, wherein said third layer is in direct contact with and permanently adhered to said second layer;
 d. a fourth layer comprising a flexible adhesive substrate having a proximate first surface and a distal second surface, said first surface of said fourth layer being in direct contact with and releaseably secured to said third layer and having formed on said first surface a three dimensional topography which is matingly inversely replicated to conform to said microstructured layer of silicone containing material of said third layer.

2. A multilayer sheet, as defined in claim 1, wherein said distal second surface of said fourth layer is visually free from any ridge pattern corresponding to said plurality of ridges of said flexible support.

3. A multilayer sheet, as defined in claim 1, wherein said distal second surface of said fourth layer has an additional exterior layer applied thereto.

4. A multilayer sheet, as defined in claim 1, wherein said distal second surface of said additional exterior layer is printed with at least one image.

5. A multilayer sheet, as defined in claim 3, wherein the percentage of initial contact surface between the adhesive layer and the additional exterior layer is from about 15% to 32% of the total covering surface.

6. A multilayer sheet, as defined in claim 3, wherein said additional exterior layer has a thickness of about 60 microns or less.

7. A multilayer sheet, as defined in claim 3, wherein said additional exterior layer is facestock.

8. A multilayer sheet, as defined in claim 1, wherein said ridges are rounded.

9. A multilayer sheet, as defined in claim 1, wherein said second layer has a thickness of 0.4-1.6 µm.

10. A multilayer sheet, as defined in claim 1, wherein said ridges have a height of about 3-50 µm.

11. A multilayer sheet, as defined in claim 10, wherein said ridges have a generally truncated pyramidal cross-sectional shape.

12. A multilayer sheet, as defined in claim 1, wherein said third layer ridges have a volume of about 15 $cm^3/m^2$.

* * * * *

UNITED STATES PATENT AND TRADEMARK OFFICE
CERTIFICATE OF CORRECTION

PATENT NO.         : 7,879,419 B2                        Page 1 of 1
APPLICATION NO.    : 10/583424
DATED              : February 1, 2011
INVENTOR(S)        : Robert Ghislain Stocq It is certified that error appears in the above-identified patent and that said Letters Patent is hereby corrected as shown below:

Column 6, line 62, "200400" should read --200-400--.

Column 11, line 16, "im, 50 im, or 40 im" should read --µm, 50 µm, or 40 µm--.

Claim 4, line 11, "claim 1" should read --claim 3--.

Signed and Sealed this
Twenty-second Day of November, 2011

David J. Kappos
*Director of the United States Patent and Trademark Office*

UNITED STATES PATENT AND TRADEMARK OFFICE
CERTIFICATE OF CORRECTION

PATENT NO.        : 7,879,419 B2
APPLICATION NO.   : 10/583424
DATED             : February 1, 2011
INVENTOR(S)       : Robert Ghislain Stocq Page 1 of 1

It is certified that error appears in the above-identified patent and that said Letters Patent is hereby corrected as shown below:

Column 6, line 62, "200400" should read --200-400--.

Column 11, line 16, "im, 50 im, or 40 im" should read --µm, 50 µm, or 40 µm--.

Column 19, line 11 (Claim 4, line 1) "claim 1" should read --claim 3--.

This certificate supersedes the Certificate of Correction issued November 22, 2011.

Signed and Sealed this
Third Day of January, 2012

David J. Kappos
*Director of the United States Patent and Trademark Office*